United States Patent
Kaikuranta et al.

(10) Patent No.: US 7,602,744 B2
(45) Date of Patent: Oct. 13, 2009

(54) DETECTION OF A SIMULTANEOUS OCCURRENCE OF AN EVENT AT A PLURALITY OF DEVICES

(75) Inventors: Terho Kaikuranta, Piispanristi (FI); Jakke Mäkelä, Turku (FI)

(73) Assignee: Nokia Corporation, Espoo (FI)

( * ) Notice: Subject to any disclaimer, the term of this patent is extended or adjusted under 35 U.S.C. 154(b) by 814 days.

(21) Appl. No.: 10/938,866

(22) Filed: Sep. 9, 2004

(65) Prior Publication Data

US 2006/0050669 A1      Mar. 9, 2006

(51) Int. Cl.
*H04W 4/00* (2006.01)

(52) U.S. Cl. ............... 370/328; 370/338; 370/313; 370/330; 370/335; 370/342; 370/343; 370/344; 370/445; 713/502; 713/178; 713/400; 713/600; 714/735; 714/736; 714/737

(58) Field of Classification Search .............. None
See application file for complete search history.

(56) References Cited

U.S. PATENT DOCUMENTS

| | | | |
|---|---|---|---|
| 3,984,815 A * | 10/1976 | Drexler et al. ........... 713/502 |
| 6,031,825 A | 2/2000 | Kaikuranta et al. | |
| 6,694,446 B1 * | 2/2004 | Charrat ................ 713/502 |
| 6,988,197 B1 * | 1/2006 | Persson et al. ........... 713/168 |
| 6,998,197 B2 * | 2/2006 | Fjeldstad et al. ........... 430/1 |
| 2004/0117365 A1 | 6/2004 | Schlageter et al. | |

FOREIGN PATENT DOCUMENTS

| | | |
|---|---|---|
| EP | 1398982 | 3/2004 |
| WO | WO 01/50657 | 7/2001 |

OTHER PUBLICATIONS

U.S. Appl. No. 10/390,548, filed Mar. 14, 2003, T. Erola et al.
U.S. Appl. No. 10/773,765, filed Feb. 5, 2004, S. Pohja et al.

* cited by examiner

*Primary Examiner*—Raj Jain
(74) *Attorney, Agent, or Firm*—Alfred A. Fressola; Ware, Fressola, Van Der Sluys & Adolphson LLP

(57) ABSTRACT

The invention relates to a detection of a simultaneous occurrence of an event of a predetermined kind at a plurality of electronic devices. At least two devices detect the event and record at their end the time elapsing after this detection. Then, a communication channel is established between the devices. Once the communication channel has been established, an indication of the recorded elapsed times can be exchanged. At least one of the devices compares a recorded elapsed time with an indicated elapsed time received from another device. If both elapsed times are similar to each other, it can be assumed that the event occurred simultaneously at both devices. The invention relates equally to corresponding devices, to a corresponding data transfer system and to corresponding software program products.

35 Claims, 4 Drawing Sheets

DETECTION OF A SIMULTANEOUS OCCURRENCE OF AN EVENT AT A PLURALITY OF DEVICES

FIELD OF THE INVENTION

The invention relates to methods for detecting a simultaneous occurrence of an event of a predetermined kind at a plurality of devices. The invention relates equally to corresponding devices, to a corresponding data transfer system and to corresponding software program products.

BACKGROUND OF THE INVENTION

The possibility of detecting the simultaneous occurrence of an event at a plurality of electronic devices may be of advantage for various applications.

In order to detect a simultaneous occurrence of a specific event at a plurality of electronic devices, the electronic devices have to notify each other about an occurrence of the event at their side. Many utilizable communication links, however, are not instantaneously available for transferring such a notification between electronic devices.

An application for which the detection of a simultaneous occurrence of an event at a plurality of electronic devices might be used is, for example, an exchange of data between the electronic devices using a direct wireless connection.

It is known to enable a direct wireless transfer of data between two electronic devices, for instance for exchanging business cards between two mobile phones. The transmission channel can be realized for instance by Bluetooth™ (BT), by means of infrared (IR) ports or by means of a Wireless Local Access Network (WLAN), or by manufacturer or industry specific protocols.

In conventional solutions, the activation and initiation of a direct wireless data transfer between two electronic devices is often considered to be complicated or annoying. Therefore, it has been proposed to enable an ad-hoc connection between two electronic devices. For such an ad-hoc connection, it is determined whether two electronic devices undergo a specific motion pattern relative to each other while being at least in close vicinity to each other. In this case, a data transfer channel is opened as a local wireless link for transferring data between the electronic devices, without any preceding complex user input. This approach has been described for example in U.S. patent application Ser. No. 10/390,548, filed on Mar. 14, 2003, which is incorporated by reference herein.

In order to ensure that the relative motion pattern is indeed achieved between two electronic devices between which an ad-hoc connection is possible and intended, it would be of advantage to verify whether the motion pattern is experienced at two electronic devices at the same time.

In case two electronic devices are connected to each other by cable, verification can be achieved by an immediate exchange of signaling data. Such devices are for instance able to handshake with wired signaling or to create interrupts to a host system which entered a power saving mode. One example is the RS-232 standard serial port in a PC, which can be employed.

If data has to be exchanged between the electronic devices using a wireless connection, however, such as a Bluetooth™ or an IrDA® (Infrared Data Association) connection, a data transmission channel initiation phase has to follow an appropriate protocol, which takes up a considerable amount of time. The caused delay prevents an instant data transmission. With Bluetooth™, the delay can be several seconds in the worst case.

Bluetooth™ enables the use of a so called 'sniffing-mode', in which a Bluetooth™ enabled device periodically listens to potential data senders. It is a disadvantage of this mode, though, that the Bluetooth™ module of a device consumes a considerable amount of power. A continuous listening mode thus reduces the operation time of the electronic device and is therefore not suited for exchanging notifications about a detected motion pattern.

Also with other types of connections, the employed data transmission means can typically not remain switched on all the time, since the power consumption and the device operation times should be kept low.

When existing network connections are used to exchange data between electronic devices, delays are involved as well, in addition to possible costs.

Common asynchronous or packet-switched data synchronization methods have the disadvantage that they require real time availability of the data transmission channel.

In general, the use of wireless connections between electronic devices thus makes an immediate signaling of an experienced motion pattern impossible.

If a notification of an experienced motion pattern is exchanged between electronic devices with a delay, the time of occurrence of the motion pattern has to be indicated as well. The internal clocks of the involved electronic devices might be set to different time zones or to different daylight saving settings, though. Further, the clock of one or more of the involved electronic devices might not be set accurately or work inaccurately, that is, the clock of one device might be running faster than the clock of another device. This makes the indication of a comparable instance of time difficult.

SUMMARY OF THE INVENTION

It is an object of the invention to enable a detection of a simultaneous occurrence of an event of a predetermined kind at a plurality of devices. It is in particular an object of the invention to enable such a detection in a simple, cost efficient and power saving manner.

A method for detecting a simultaneous occurrence of an event of a predetermined kind at a plurality of electronic devices is proposed, which comprises at a first one of the electronic devices detecting an event of the predetermined kind. The method further comprises recording a time elapsing after detection of the event. The method further comprises establishing a communication channel to at least one other of the electronic devices. The method further comprises receiving from at least one other of the electronic devices via the communication channel an indication of a time which has elapsed after an event of the predetermined kind was detected at the at least one other of the electronic devices. The method further comprises upon receipt of the indication from at least one other of the electronic devices, determining whether the indicated elapsed time is similar to the recorded elapsed time, a simultaneous occurrence of an event of the predetermined kind at the first one of the electronic devices and at the at least one other of the electronic devices being assumed in the case of similar indicated and recorded elapsed times.

Moreover, a method for detecting a simultaneous occurrence of an event of a predetermined kind at a plurality of electronic devices is proposed, which comprises at one of the electronic devices detecting an event of the predetermined kind. Further, this method comprises recording a time elapsing after detection of the event. Further, this method comprises waiting for a request to establish a communication channel from another one of the electronic devices. Further, this method comprises establishing a communication channel to the other one of the electronic devices. Finally, this method comprises transferring an indication of the elapsed time via the communication channel to the other one of the electronic devices.

The proposed methods thus constitute complementary methods at two interacting electronic devices.

Moreover, an electronic device is proposed, which comprises sensor means adapted to detect an event of a predetermined kind. The proposed electronic device further comprises recording means adapted to record a time elapsing after the sensor means detected an event of the predetermined kind. The proposed electronic device further comprises communication means adapted to establish a communication channel to at least one other electronic device and to receive from this at least one other electronic device via the communication channel an indication of a time which has elapsed after an event of the predetermined kind was detected at the at least one other electronic device. The proposed electronic device further comprises processing means adapted to determine upon receipt of an indication of an elapsed time from at least one other electronic device whether the indicated elapsed time is similar to the recorded elapsed time, and to assume a simultaneous occurrence of the event at the electronic device and at the at least one other electronic device in case of similar indicated and recorded elapsed times.

Moreover, an electronic device is proposed which comprises as well sensor means adapted to detect an event of a predetermined kind and recording means adapted to record a time elapsing after the sensor means detected an event of the predetermined kind. This proposed electronic device further comprises communication means adapted to establish a communication channel to another electronic device upon request by the other electronic device, and to transfer an indication of an elapsed time recorded by the recording means to the other electronic device via the communication channel.

The proposed electronic devices thus constitute complementary electronic devices which are suited to interact with each other. It is to be understood that a single electronic device may comprise the features of both proposed electronic devices.

Moreover, a data transfer system is proposed, which comprises at least one of each of the proposed electronic devices.

Moreover, software program products are proposed, in which a software code for detecting a simultaneous occurrence of an event of a predetermined kind at a plurality of electronic devices is stored. When running in an electronic device, the software code realizes the steps of one of the proposed methods.

The invention proceeds from the consideration that for determining the simultaneous occurrence of an event at a plurality of electronic devices, it is not necessary to compare the absolute times of occurrence of the event at the involved electronic devices. Instead, it is sufficient to evaluate relative times. It is therefore proposed that at each device, the time is measured which elapses after the detection of an event until a communication channel has been established. The established communication channel can be used for transferring information on the elapsed times between the devices. At least one of the electronic devices experiencing an occurrence of the event may then receive from at least one other electronic device information on elapsed time measured at this other electronic device. When a comparison shows that a received elapsed time is basically the same as a measured elapsed time, it can be assumed that the event occurred simultaneously at both electronic devices.

It is an advantage of the invention that it enables a detection of a simultaneous occurrence of an event of a predetermined kind at a plurality of electronic devices.

It is in particular an advantage of the invention that it enables such a detection for electronic devices having different clock times. For example, one or more of the electronic devices may be set to a wrong time or use an inaccurate clock. The electronic devices may also be set to different time zones or have different daylight saving settings.

At the same time, a slow initiation of a communication channel is tolerated. This increases the types of communication channels which can be employed. The communication channel may thus be based on any available communication technology and protocol, including for example Bluetooth™ and infrared links. In general, the invention is of particular advantage for use with a wireless communication channel. Moreover, some components of the electronic devices may be in a power saving mode or be waiting for the next wake-up moment, while the time elapsing after a detected event is recorded. The time may be recorded for instance by a sensor detecting the event, by a separate timer, by a separate application processor or by a separate sensor processor.

Many conventional electronic devices already comprise a sensor as sensor means, a timer as recording means and communication means. For these electronic devices, it is further an advantage of the invention that it can be implemented by means of a pure software modification and that no additional hardware components are required. However when beneficial, a hardware implementation can also be used, including for example sensors, timers, a data link and an elapsed time comparator, thus enabling a host system to remain in a power saving mode.

It is further an advantage of the invention that it does not require any user action and results therefore in a good usability of the involved electronic devices. It is to be understood, of course, that the predetermined event may be caused by the user and that an action which is to follow upon a detected simultaneous event may be selected or specified by a user.

The recorded elapsed time and the indicated elapsed time can be determined to be similar if they are equal to each other with a predetermined accuracy. By setting this accuracy to a suitable value, different reaction times of sensors detecting the event and the time required for the transfer of an indication of an elapsed time can be taken account of.

The event which is to be detected can be of any type, as long as it is predetermined and detectable at all involved electronic devices. An event can be for instance a certain absolute or relative motion pattern which an electronic device experiences. For detecting the predetermined event, any suitable sensors can be employed.

In one embodiment of the invention, the event is a touch between an electronic device and some other object, for instance a touch resulting when the electronic device is knocked by its user to another electronic device. In this case, the event can be detected for instance by an acceleration sensor or by a multisensor of the electronic device. An acceleration sensor may detect for instance acceleration values and/or directions which are indicative of a knock.

The detection of a simultaneous occurrence of an event at several electronic devices can also be made use of in various ways.

In one embodiment of the invention, for instance, the internal clock time of an electronic device detecting an event is transmitted together with an indication of a time which has elapsed since the event. In this case, the receiving device may synchronize its own clock with the clock of the electronic device providing the indication of an elapsed time and the internal clock time.

In another embodiment of the invention, the detection of a simultaneous occurrence of an event at several electronic devices is used as a hint that an ad-hoc connection is to be enabled between the electronic devices for exchanging data.

The data can be data of any type, for instance data of a file, of an email, of a picture, of a video clip, of a business card, of a ring tone, of wallpaper, of a control command, etc.

The data which is to be transmitted between electronic devices can be selected for instance in that a user of the first electronic device selects at least one item defined by certain data. The selection can be performed for instance by marking a file or simply by viewing a picture or video clip, etc., or several of them. The data exchange then comprises transferring at least one selected data item to at least one other electronic device.

In one embodiment of the invention, the recorded elapsed times are exchanged between the involved electronic devices and compared at either end. That is, the at least one other one of the electronic devices receives from the first one of the electronic devices via the communication channel an indication of a time which has elapsed after an event of the predetermined kind was detected at the first one of said electronic devices. Upon receipt of the indication from the first one of the electronic devices, the at least one other one of the electronic devices may then determine whether the indicated elapsed time is similar to the recorded elapsed time, a simultaneous occurrence of the event at the first one of the electronic devices and at the at least one other of the electronic devices being assumed to be given in case of similar indicated and recorded elapsed times.

In this case, a data exchange between two electronic devices may only be carried out in case both involved electronic devices assume a simultaneous occurrence of an event to be given.

The first one of the electronic devices may be enabled to separate various other electronic devices by means of device-specific identifications. Such device specific identifications may be provided anyhow due to the data exchange protocol which is employed for establishing the communication channel between the electronic devices. Otherwise, a device specific identification may be provided via the communication channel together with an indication of an elapsed time. An identification code can be part of a data token. A device specific identification enables a simultaneous but independent use of the invention for several close-by electronic devices. Further, it makes a denial-of-service attack more difficult, which increases the reliability of an application making use of the invention.

The invention can be employed for detecting the simultaneous occurrence of an event at two electronic devices or at more than two electronic devices. In the latter case, the occurrence of a single event at more than two electronic devices or the occurrence of several events at respectively two devices may be determined. Obviously, also a combination of these options is possible.

In one embodiment of the invention, the first one of the electronic devices may be defined to this end to be a master device, while a plurality of other electronic devices are defined to be slave devices. Generally, any known method for a master selection used within asynchronous protocols can be used. The master device may then detect at least one event of the predetermined kind and record a time elapsing after detection of each of the events. Further, the master device may establish a communication channel to a plurality of slave devices and receive from a plurality of slave devices via the communication channel an indication of a time which has elapsed after an event of the predetermined kind was detected at a respective one of the plurality of slave devices. Upon receipt of the indication from the plurality of slave devices, the master device may then determine whether any of the indicated elapsed times is similar to the at least one recorded elapsed time.

This embodiment can also be employed for establishing an ad-hoc communication network quite straightforwardly and reliably, with little additional complexity.

For a 1-to-N network, for instance, the master device may enable a simultaneous communication with a plurality of slave devices at which an event occurred basically at the same time as at the master device.

The communications may be based on a 'handshake' procedure which is initiated by the master device with any slave device from which an indication of an elapsed time has been received which is similar to the at least one recorded elapsed time. The 'handshake' procedure may enable a master device and a slave for example to authenticate each other and/or to set parameters of a data transfer connection that is to be used.

The master device may also be enabled to add further slave devices to a network, when a further event is detected to have occurred simultaneously at the master device and at this further slave device.

For an N-to-N network, the master device may distribute an identification of any of the slave devices, at which an event occurred simultaneously as at the master device, to the respective other ones of the slave devices. Thereby, the master device enables a communication among the slave devices as well.

When employed for establishing a virtual communication network, the invention eliminates the need for a real-time synchronization between the involved devices.

The invention can be employed for any application for which the detection of a simultaneous occurrence of an event at a plurality of electronic devices is of relevance.

It can be used, for instance, in any data transfer concept in which device internal clocks have to be set to the same time. It can further be used in particular, though not exclusively, for supporting an ad-hoc connection between various electronic devices. It may be used, for example, for transferring a picture or video clip from a mobile phone to a TV set, where the picture or the video clip is presented. It may also be used for exchanging business cards between different mobile phones and/or Personal Digital Assistants (PDA). It may also be used for dropping a file from a mobile phone to a PC for storage or to a printer for a printout, from a mobile phone to a car or from a digital camera to a PC. It may also be used for synchronizing calendar entries or phonebook entries between a mobile phone and a PC or between two mobile phones. Moreover, it may be used by a mobile phone for retrieving more information from a Radio Frequency Identification Tag (RDIF) enabled advertisement, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
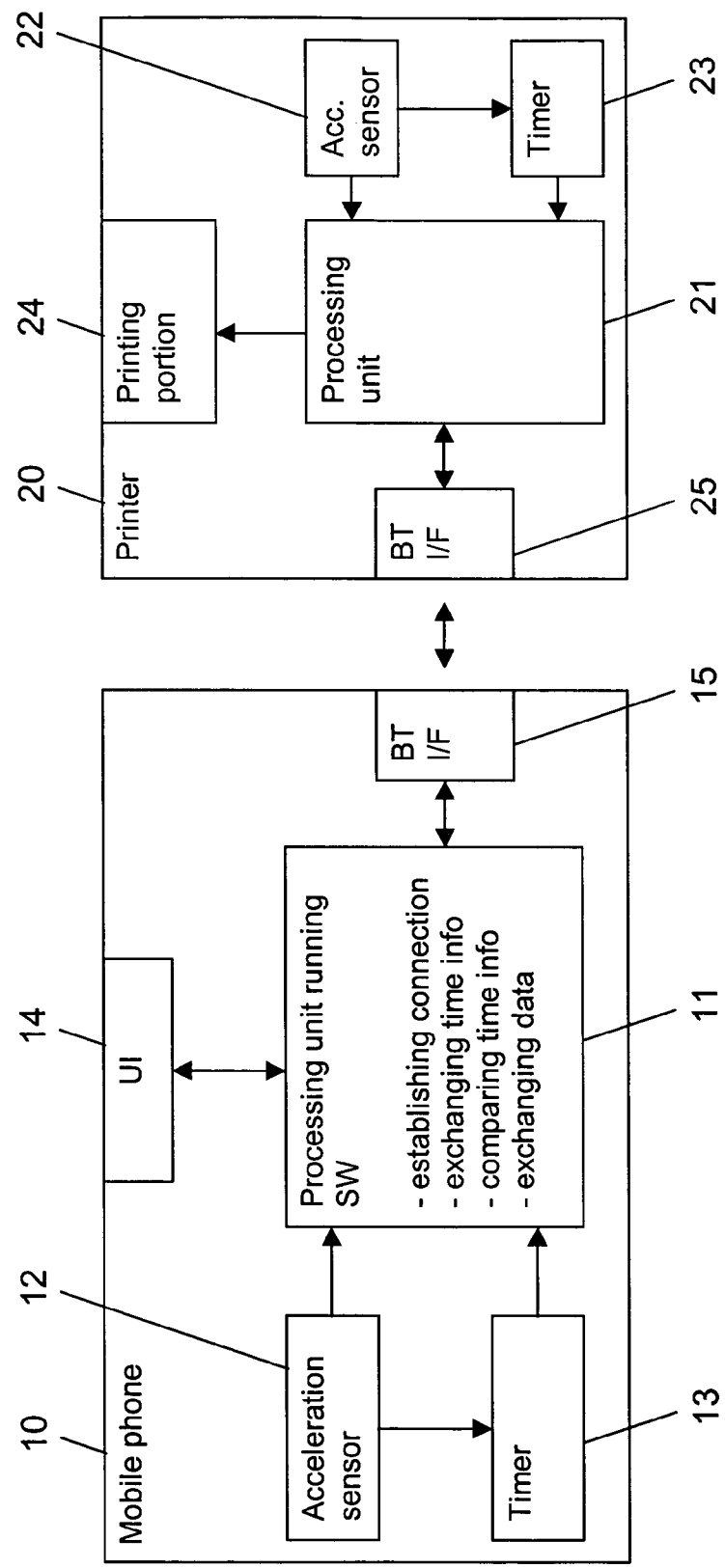
FIG. 1 is a schematic block diagram of a first system according to an embodiment of the invention.

FIG. 1 is a block diagram of a first system in which the simultaneous occurrence of an event at several electronic devices can be detected in accordance with an embodiment of the invention.

The system comprises a mobile phone 10 as a first electronic device and a printer 20 as a second electronic device.

The mobile phone 10 comprises a processing unit 11, which is connected within the mobile phone 10 to an acceleration sensor 12, to a timer 13, to a user interface UI 14 and to a Bluetooth™ interface BT I/F 15. The processing unit 11 runs a software SW, which includes a code for performing various functions. The acceleration sensor 12 is moreover connected to the timer 13. In addition, the mobile phone 10 may comprise any other component of a conventional mobile phone.

The printer 20 comprises a processing unit 21, which is connected within the printer 20 to an acceleration sensor 22, to a timer 23, to a printing portion 24 and to a Bluetooth™ interface BT I/F 25. The processing unit 21 runs a software SW, which includes a code for performing various functions. The acceleration sensor 22 is moreover connected to the timer 23. The printing portion 24 may comprise any component of a conventional printer.

The operation in the system will now be explained with reference to the time chart of FIG. 2.

Figure 2:
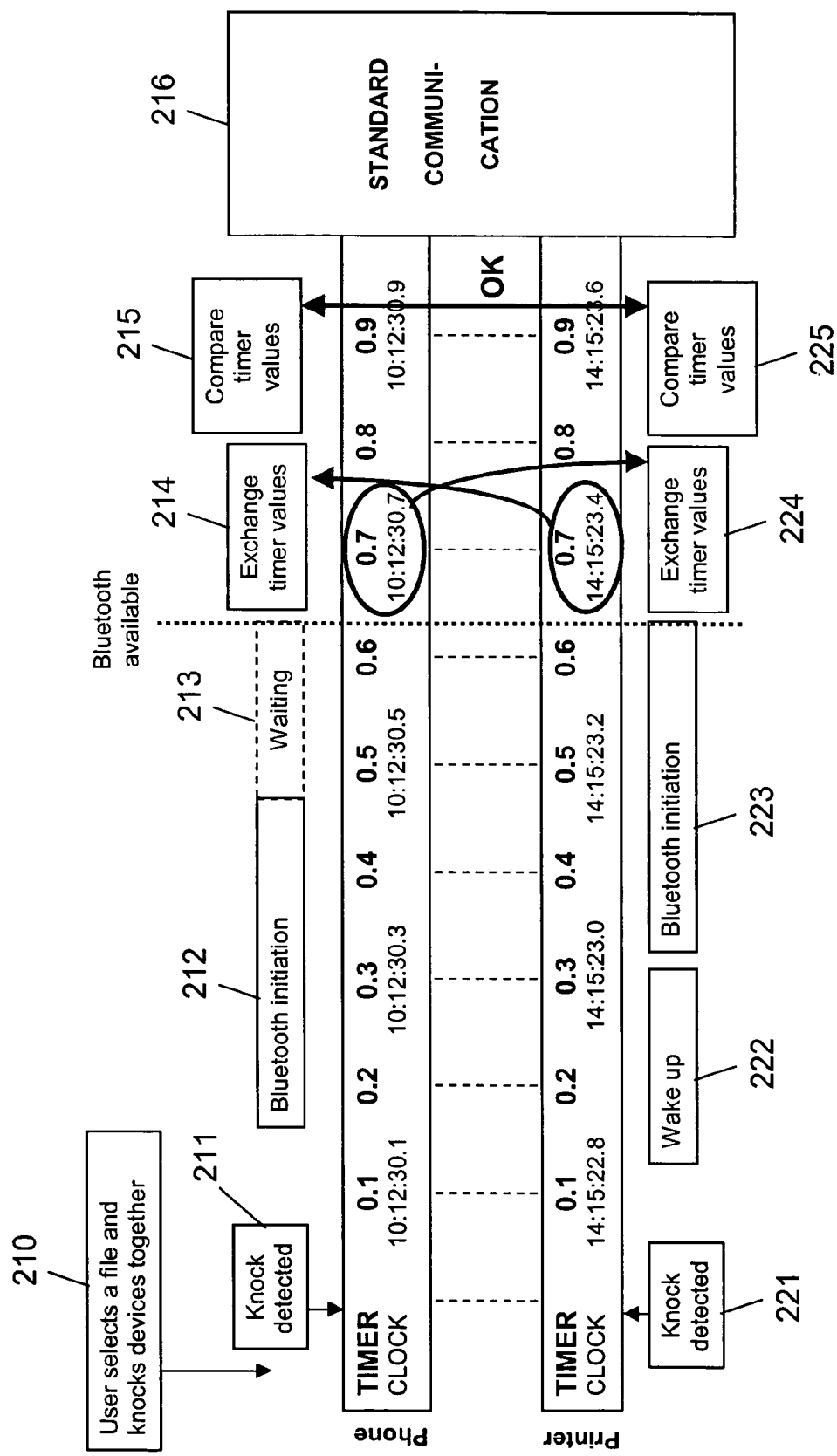
FIG. 2 is a flow chart illustrating an operation in the system of FIG. 1.

FIG. 2 indicates in an upper part a time line for the mobile phone 10 and in a lower part a time line for the printer 20. An internal clock of the printer 20 is set to a time zone with four hours difference compared to an internal clock of the mobile phone 10. Moreover, the internal clock of the printer 20 has an offset of approximately three minutes compared to the internal clock of the mobile phone 10.

A user of the mobile phone 10 first selects via the user interface 14 an item, for which data is to be sent to the printer 20. Such an item can be, for instance, a received email or a picture taken with a camera of the mobile phone 10. A blinking icon presented via the user interface 14 then indicates to the user that an ad-hoc transmission of the data could be initiated. In order to initiate the data transfer, the user now knocks the mobile phone 10 to the printer 20. (step 210)

The acceleration sensor 12 of the mobile phone 10 detects the knock at an internal time of 10:12:30.0 and activates the timer 13. Thereupon, the timer 13 starts counting the time in steps of 0.1 seconds, beginning at zero. (step 211)

The acceleration sensor 22 of the printer 20 detects the knock at the same time as the acceleration sensor 12 of the mobile phone 10, but in the printer 20, the time of detection corresponds to an internal time of 14:15:22.7. The acceleration sensor 22 activates the timer 23. Thereupon, the timer 23 starts counting the time in steps of 0.1 seconds, beginning at zero. (step 221)

The acceleration sensor 12 of the mobile phone 10 moreover provides an indication of the detected knock to the processing unit 11. The processing unit 11 starts a Bluetooth™ initialization, including a transmission of control signals via the Bluetooth™ interface 15. (step 212)

The acceleration sensor 22 of the printer 20 provides in addition an indication of the detected knock to the processing unit 21 for waking up the processing unit 21. (step 222)

After a while, the processing unit 21 receives from the mobile phone 10 control signals for a Bluetooth™ connection via the Bluetooth™ interface 25. The processing unit 21 starts thereupon as well a Bluetooth™ initialization.

When the processing unit 11 of the mobile phone 10 has completed its Bluetooth™ initialization, it waits for an indication from the printer 20, that the processing unit 21 of the printer 20 has equally completed its Bluetooth™ initialization. (step 213). In the both devices, this initialization can last several seconds.

When the processing unit 21 of the printer 20 has completed its Bluetooth™ initialization, it transmits a corresponding indication to the mobile phone 10.

The mobile phone 10 and the printer 20 are now able to make use of a Bluetooth™ connection.

It might be preferable that no user confirmation is required for this data link establishment, to support the purpose of improved usability. If needed, there might be a user-defined selection whether a confirmation is needed or not, as typically, the Bluetooth™ link activation notifies a user that an external device wants to establish a connection.

First, the mobile phone 10 and the printer 20 now exchange their respective timer value via the Bluetooth™ connection.

The processing unit 11 of the mobile phone 10 retrieves to this end the current value of the timer 13. In the presented example, the value is 0.7 s, which is reached at an internal clock time of 10:12:30.7. This timer value is then transmitted via the Bluetooth™ interface 15. (step 214)

At the same time, the processing unit 21 of the printer 20 retrieves the current value of the timer 23. In the presented example, the value is 0.7 s, which is reached at an internal clock time of 14:15:23.4. This timer value is then transmitted via the Bluetooth™ interface 25. (step 224)

The processing unit 11 of the mobile phone 10 then compares the retrieved timer value with the timer value received from the printer 20. Both are determined to be equal within a predetermined accuracy. As such an accuracy, for example a time difference of less than 100 ms can be selected. Basically equal timer values indicate to the processing unit 11 that a knocking has been registered at the same time at the mobile phone 10 and at a device 20 from which the timer value has been received. (step 215)

In parallel, the processing unit 21 of the printer 20 compares the retrieved timer value with the timer value received from the mobile phone 10. Both are determined to be equal within a predetermined accuracy. This indicates to the processing unit 21, that a knocking has been registered at the same time at the printer 20 and at a device 10 from which the timer value has been received. (step 225)

Thereafter, the processing unit 11 of the mobile phone 10 and the processing unit 21 of the printer 20 exchange via the Bluetooth™ connection the information that the compared timer values have respectively been determined to be approximately the same, and that the desired data transfer can be carried out. This is indicated in FIG. 2 with a double headed arrow labeled 'OK'.

In the presented embodiment, thus four conditions have to be met before a data transfer is carried out: at least one data item has to be selected, a transfer has to be allowed, a knocking has to have occurred, and the knocking has to have occurred at the same time at two electronic devices. It becomes apparent that, due to the different set time zones and the timing offset, the latter condition could not be checked by simply exchanging the internal clock times of the instance at which a knock is detected at both devices 10, 20. Nevertheless, the presented approach is not dependent on the length of an initiation delay, as long as the devices are within an operational distance of a Bluetooth™ link. Thus, a data transmission synchronization method is enabled, which is capable of synchronizing devices in future-time as compared to the moment when a user makes a knock.

The devices 10, 20 may now initiate a standard communication task. (step 216)

For instance the data of a selected email or of a selected photo may be transferred via the Bluetooth™ connection from the mobile phone 10 to the printer 20. Upon receipt of such data, the processing unit 21 of the printer 20 forwards the data to its printing portion 24, and the printing portion 24 provides a printout of the data.

The user of the mobile phone 10 can be informed about the ongoing data transfer via the user interface 14.

Figure 3:
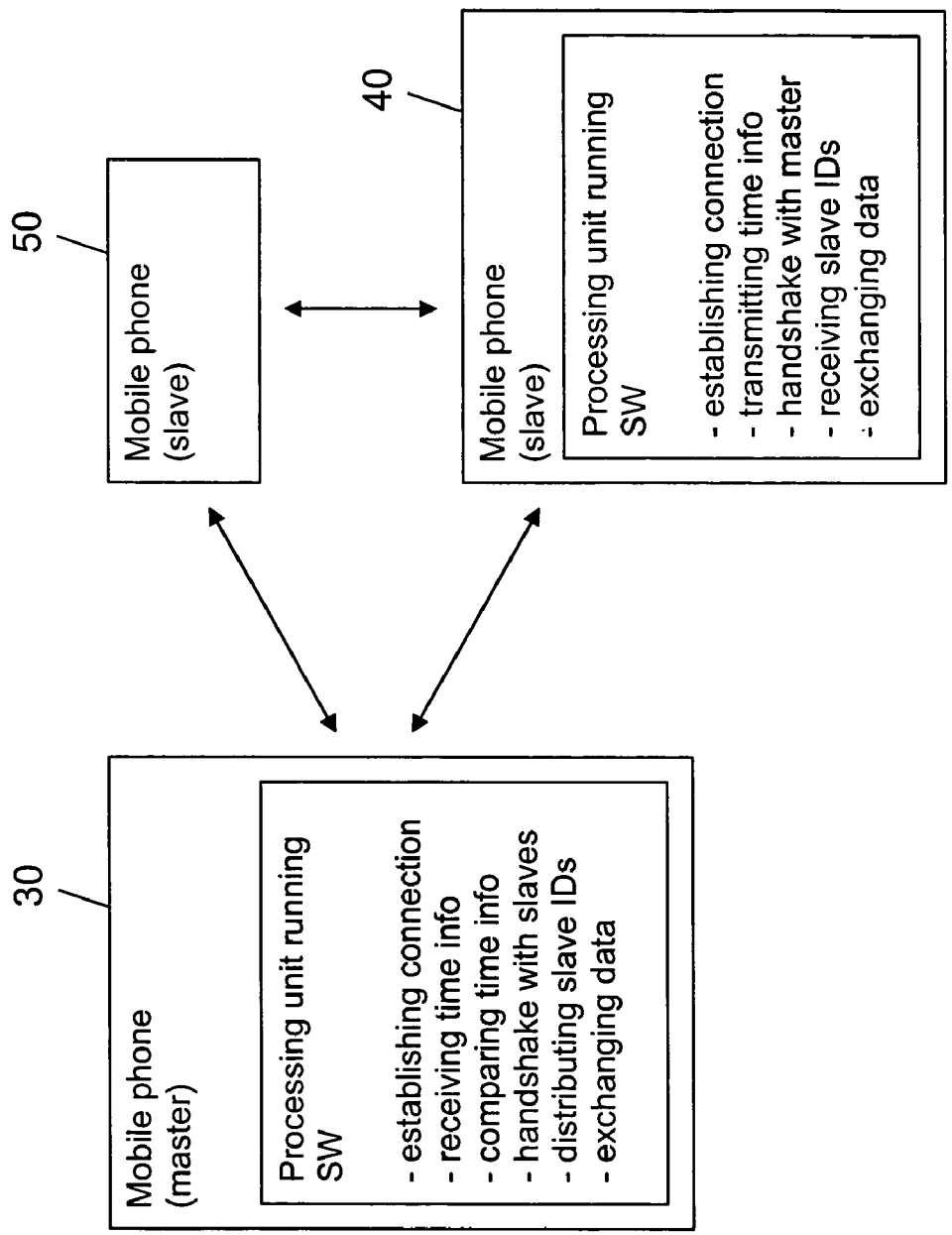
FIG. 3 is a schematic block diagram of a second system according to an embodiment of the invention.

FIG. 3 is a block diagram of a second system in which the simultaneous occurrence of an event at several electronic devices can be detected in accordance with an embodiment of the invention.

The system comprises a plurality of mobile phones 30, 40, 50, which are to be connected in an ad-hoc network.

Each of the mobile phones 30, 40, 50 comprises the same components as the mobile phone 10 of FIG. 1. Of these components, only the respective processing component 31, 41 of two of the mobile phones 30, 40 is indicated in FIG. 3.

One of the mobile phones 30 operates as a master, while the other mobile phones 40, 50 operate as slaves. The software run by the processing units 31, 41 of the mobile phones 30, 40, 50 comprises a respective code, which is adapted to establish and use a virtual network, as will become apparent from the following description of the operation of the system referring to FIG. 4.

Figure 4:
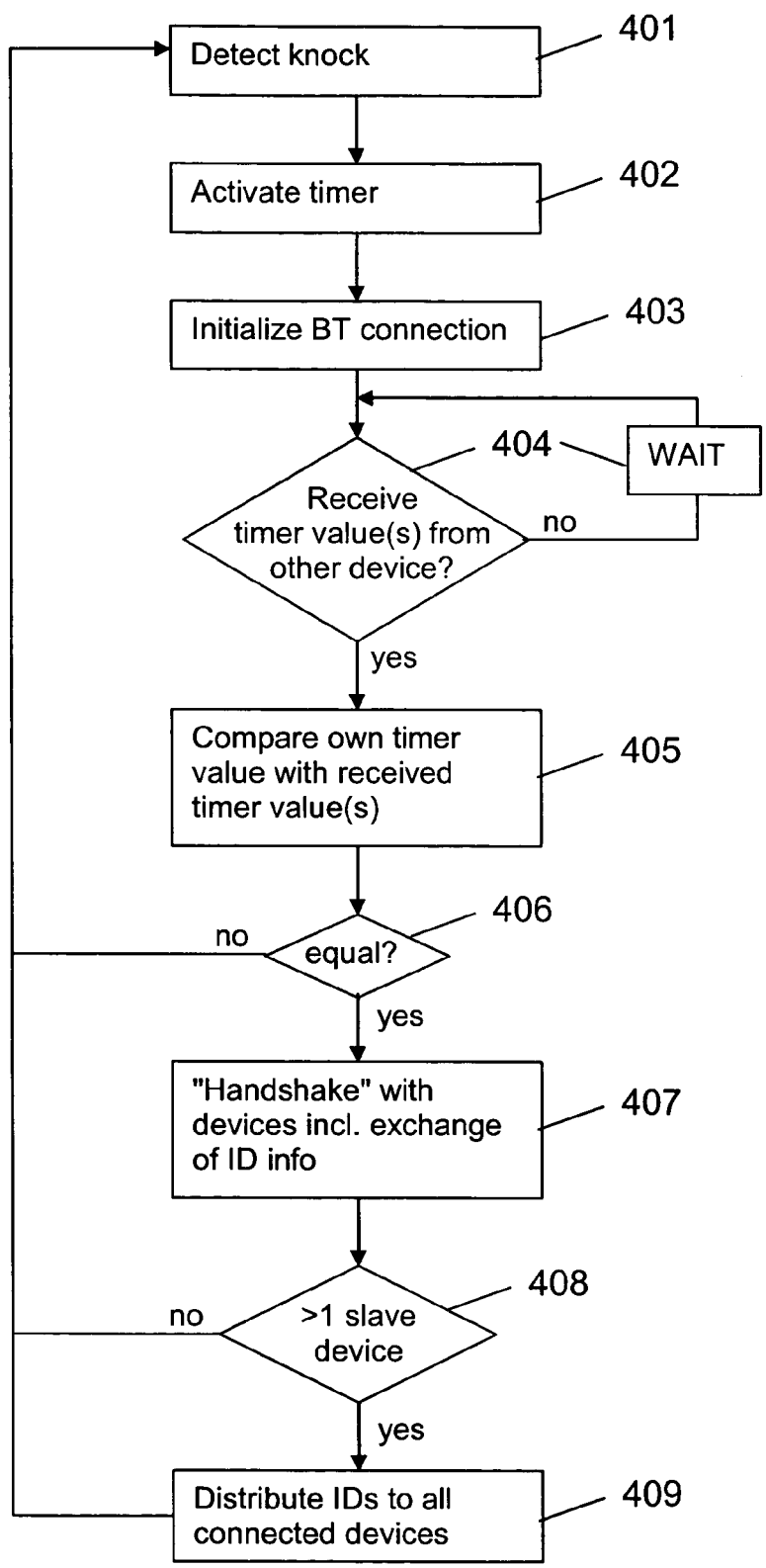
FIG. 4 is a flow chart illustrating an operation at a master device of the system of FIG. 3.

The flow chart of FIG. 4 illustrates the operation at the master phone 30.

When the master phone 30 detects a knock (step 401), it starts a timer (step 402) and initiates a Bluetooth™ connection (step 403).

Then, the master phone 30 waits until it receives a timer value from at least one of the slave phones 40 (step 404). If no timer value is received within a predetermined period of time, the master phone 30 may wait until it detects a further knock (step 401). If, in contrast, at least one timer value is received within the predetermined period of time (step 404), the master phone 30 compares the own timer value with the received value or values (step 405).

If none of the received timer values corresponds to the own timer value with a predefined accuracy (step 406), the master phone 30 waits until it detects a further knock (step 401). If, in contrast, the own timer value corresponds to the timer value received from one of the slave phones 40 with a predefined accuracy (step 406), the master phone 30 initiates a 'handshake' procedure with this slave phone 40, in the course of which also identity information (ID) is exchanged between the phones 30, 40 (step 407).

In case the own time value corresponds to the timer values received from more than one of the slave phones 40, 50 with a predefined accuracy, the master phone 30 initiates a 'handshake' procedure with all of these slave phones 40, 50 one after the other. The latter situation may occur, for instance, if more that one slave phone 40, 50 is knocked to the master phone 30 basically at the same time.

Thereafter, the master phone 30 is able to exchange data with all slave phones 40, 50 with which a successful 'handshake' procedure has been performed.

The master phone 30 may moreover detect in a loop further knocks (step 401), in order to establish a connection to other slave phones 40, 50 (steps 402 to 407).

When there are two or more slave phones 40, 50 connected to the master phone 30 (step 408), the master phone 30 distributes the collected identity information to all involved slave phones 40, 50 (step 409). As a result, the slave phones 40, 50 can communicate as well among each other, in case this is enabled by the employed communication protocol.

The master phone 30 is the only phone, however, which is allowed to add further slave phones to the established virtual network as described above, and the only phone which is allowed to delete slave phones from the established virtual network.

Alternatively to exchanging identity information during the 'handshake' procedure, the identity information could be transmitted during the initiation of the link, or be attached to the transferred timer values.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising at a first electronic device:
   detecting an event of a predetermined kind;
   recording a time elapsing after detection of said event;
   establishing a communication channel to at least one other electronic device
   receiving from at least one other electronic device via said communication channel an indication of a time which has elapsed after an event of said predetermined kind was detected at said at least one other electronic device; and
   upon receipt of said indication from said at least one other electronic device determining whether said indicated elapsed time is similar to said recorded elapsed time, a simultaneous occurrence of said event at said first electronic device and at said at least one other electronic device being assumed to be given in case of similar indicated and recorded elapsed times.

2. The method according to claim 1, wherein said recorded elapsed time and said indicated elapsed time are determined to be similar if they are equal to each other with a predetermined accuracy.

3. The method according to claim 1, wherein said event of a predetermined kind comprises a physical touch of an electronic device detecting said event with another object.

4. The method according to claim 1, further comprising in case said recorded elapsed time and said indicated elapsed time are determined to be similar, exchanging data between said first one of said electronic devices and said at least one other of said electronic devices.

5. The method according to claim 4, wherein a user of said first one of said electronic devices is-enabled to select at least one data item, and wherein said data exchange comprises transferring data belonging to at least one selected data item to said at least one other of said electronic devices.

6. The method according to claim 1, further comprising at said at least one other of said electronic devices:
   detecting an event of said predetermined kind;
   recording a time elapsing after detection of said event;
   waiting for a request to establish a communication channel from said first one of said electronic devices;
   establishing a communication channel to said first one of said electronic devices; and
   transferring an indication of said elapsed time via said communication channel to said first one of said electronic devices.

7. The method according to claim 6, further comprising at said at least one other of said electronic devices:
   receiving from said first one of said electronic devices via said communication channel an indication of a time which has elapsed after an event of said predetermined kind was detected at said first one of said electronic devices; and
   upon receipt of said indication from said first one of said electronic devices, determining whether said indicated elapsed time is similar to said recorded elapsed time, a simultaneous occurrence of said event at said first one of said electronic devices and at said at least one other of said electronic devices being assumed to be given in case of similar indicated and recorded elapsed times.

8. The method according to claim 7, further comprising in case said recorded elapsed time and said indicated elapsed time are determined to be similar at said first one of said electronic devices and at said at least one other of said electronic devices, exchanging data between said first one of said electronic devices and said at least one other of said electronic devices.

9. The method according to claim 8, wherein a user of said first one of said electronic devices is enabled to select at least one data item, and wherein said data exchange comprises transferring data belonging to at least one selected data item to said at least one other of said electronic devices.

10. The method according to claim 1, wherein an identification of said at least one other of said electronic devices, from which an indication of an elapsed time is received at said first one of said electronic devices, is provided to said first one of said electronic devices in the scope of a data exchange protocol employed for establishing said communication channel.

11. The method according to claim 1, wherein an identification of said at least one other of said electronic devices, from which an indication of an elapsed time is received at said first one of said electronic devices, is provided to said first one of said electronic devices together with said indication of said elapsed time via said communication channel.

12. The method according to claim 1, wherein said first one of said electronic devices is a master device and wherein said other ones of said electronic devices are slave devices, said method comprising at said master device:
   detecting at least one event of said predetermined kind;
   recording a time elapsing after detection of said at least one event at said master device;
   establishing a communication channel to a plurality of slave devices
   receiving from a plurality of said slave devices via said communication channel an indication of a time which has elapsed after an event of said predetermined kind was detected at a respective one of said plurality of slave devices; and
   upon receipt of said indication from said plurality of slave devices, determines whether any of said indicated elapsed times is similar to said at least one recorded elapsed time.

13. The method according to claim 12, wherein said master device enables a simultaneous data exchange with a plurality of said slave devices from which an indication of an elapsed time has been received which is similar to said at least one recorded elapsed time.

14. The method according to claim 13, wherein said master device enables a data exchange with a further slave device, from which an indication of an elapsed time is received, which is similar to an elapsed time recorded at said master device for a further detected event of said predetermined kind.

15. The method according to claim 12, wherein said master device distributes an identification of any of said slave devices, for which said master device determined that an indicated elapsed time is similar to a recorded elapsed time, to the respective other ones of said slave devices, for enabling a communication among said slave devices.

16. A computer readable medium encoded with a set of instructions, said instructions realizing the method of claim 1 when running in said first electronic device.

17. A method comprising at a first electronic device:
   detecting an event of a predetermined kind;
   recording a time elapsing after detection of said event;
   waiting for a request to establish a communication channel from another electronic device;
   establishing a communication channel to said other electronic device; and
   transferring an indication of said elapsed time via said communication channel to said other electronic device for enabling said other electronic device to detect a simultaneous occurrence of an event of said predetermined kind at least at said first electronic device and said other electronic device.

18. A computer readable medium encoded with a set of instructions, said instructions realizing the method of claim 17 when running in said first electronic device.

19. An apparatus comprising:
   a sensor configured to detect an event of a predetermined kind;
   a recording component configured to record a time elapsing after said sensor detected an event of said predetermined kind;
   a communication component configured to establish a communication channel to at least one other apparatus and to receive from said at least one other apparatus via said communication channel an indication of a time which has elapsed after an event of said predetermined kind was detected at said at least one other apparatus; and
   a processing component configured to determine upon receipt of an indication of an elapsed time from at least one other apparatus whether said indicated elapsed time is similar to said recorded elapsed time, and to assume a simultaneous occurrence of said event at said apparatus and at said at least one other apparatus in case of similar indicated and recorded elapsed times.

20. The apparatus according to claim 19, wherein said processing component is configured to determine that said recorded elapsed time and said indicated elapsed time are similar if they are equal to each other with a predetermined accuracy.

21. The apparatus according to claim 19, wherein said sensor is configured to detect a physical touch of said apparatus with another object as said event of a predetermined kind.

22. The apparatus according to claim 19, wherein said processing component is configured to cause an exchange of data between said apparatus and said at least one other apparatus, in case said recorded elapsed time and said indicated elapsed time are determined to be similar.

23. The apparatus according to claim 22, further comprising a user interface configured to enable a user of said apparatus to select at least one data item, wherein said processing component is configured to cause an exchange of data which comprises a transfer of data belonging to at least one selected data item to said at least one other apparatus.

24. The apparatus according to claim 19, wherein said communication component is configured to receive an identification of said at least one other apparatus, from which an indication of an elapsed time is received, in the scope of a data exchange protocol employed for establishing said communication channel.

25. The apparatus according to claim 19, wherein said communication component is configured to receive an identification of said at least one other apparatus, from which an indication of an elapsed time is received, together with said indication of said elapsed time via said communication channel.

26. The apparatus according to claim 19,
wherein said apparatus is a master device and wherein said at least one other apparatus is a slave device;
wherein said communication component is configured to establish a communication channel to a plurality of slave devices and to receive from a plurality of said slave devices via said communication channel an indication of a time which has elapsed after an event of said predetermined kind was detected at a respective one of said plurality of slave devices; and
wherein said processing component is configured to determine upon receipt of said indication from said plurality of slave devices, whether any of said indicated elapsed times is similar to at least one recorded elapsed time.

27. The apparatus according to claim 26, wherein said communication component is configured to enable a simultaneous data exchange with a plurality of said slave devices from which an indication of an elapsed time has been received which is similar to said at least one recorded elapsed time.

28. The apparatus according to claim 27, wherein said communication component is configured to enable a data exchange with a further slave device, from which an indication of an elapsed time is received, which is similar to an elapsed time recorded at said apparatus for a further detected event of said predetermined kind.

29. The apparatus according to claim 26, wherein said communication component is configured to distribute an identification of any of said slave devices, for which said processing component determined that an indicated elapsed time is similar to a recorded elapsed time, to the respective other ones of said slave devices, for enabling a communication among said slave devices.

30. The apparatus according to claim 19, wherein said apparatus is an electronic device.

31. An apparatus comprising:
a sensor configured to detect an event of a predetermined kind;
a recording component configured to record a time elapsing after said sensor detected an event of said predetermined kind; and
a communication component configured to establish a communication channel to another apparatus upon request by said other apparatus, and to transfer an indication of an elapsed time recorded by said recording component to said other apparatus via said communication channel.

32. The apparatus according to claim 31, wherein said apparatus is an electronic device.

33. A data transfer system comprising a plurality of electronic devices,
at least a first one of said electronic devices comprising:
a sensor configured to detect an event of a predetermined kind;
a recording component configured to record a time elapsing after said sensor detected an event of said predetermined kind;
a communication component configured to establish a communication channel to at least one other electronic device and to receive from said at least one other electronic device via said communication channel an indication of a time which has elapsed after an event of said predetermined kind was detected at said at least one other electronic device; and
a processing component configured to determine upon receipt of an indication of an elapsed time from at least one other electronic device whether said indicated elapsed time is similar to said recorded elapsed time, and to assume a simultaneous occurrence of said event at said electronic device and at said at least one other electronic device in case of similar indicated and recorded elapsed times; and
at least one other of said electronic devices comprising:
a sensor configured to detect an event of a predetermined kind;
a recording component configured to record a time elapsing after said sensor detected an event of said predetermined kind; and
a communication component configured to establish a communication channel to said first one of said electronic devices upon request by said first one of said electronic devices, and to transfer an indication of an elapsed time recorded by said recording component to said first one of said electronic devices via said communication channel.

34. An apparatus comprising:
means for detecting an event of a predetermined kind;
means for recording a time elapsing after detection of said event;
means for establishing a communication channel to at least one electronic device;
means for receiving from at least one electronic device via said communication channel an indication of a time which has elapsed after an event of said predetermined kind was detected at said at least one electronic device; and
means for determining whether said indicated elapsed time is similar to said recorded elapsed time upon receipt of said indication from said at least one electronic device, a simultaneous occurrence of said event at said apparatus and at said at least one electronic device being assumed to be given in case of similar indicated and recorded elapsed times.

35. An apparatus comprising:

means for detecting an event of a predetermined kind;

means for recording a time elapsing after detection of said event;

means for waiting for a request to establish a communication channel from an electronic device and for establishing a communication channel to said electronic device; and means for transferring an indication of said elapsed time via said communication channel to said electronic device for enabling said electronic device to detect a simultaneous occurrence of an event of said predetermined kind at least at said apparatus and said electronic device.

* * * * *

UNITED STATES PATENT AND TRADEMARK OFFICE
CERTIFICATE OF CORRECTION

PATENT NO. : 7,602,744 B2
APPLICATION NO. : 10/938866
DATED : October 13, 2009
INVENTOR(S) : Kaikuranta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1401 days.

Signed and Sealed this

Fifth Day of October, 2010

David J. Kappos
*Director of the United States Patent and Trademark Office*